United States Patent
Ide et al.

(10) Patent No.: US 7,199,186 B2
(45) Date of Patent: Apr. 3, 2007

(54) CARBON-PHENOL RESIN MOLDING COMPOUND

(75) Inventors: Isamu Ide, Sakai (JP); Masanobu Nishikawa, Osaka (JP); Hisato Higuchi, Sakai (JP); Tsunemori Yoshida, Kobe (JP); Katsunori Sugita, Sanda (JP)

(73) Assignees: Lignyte Co., Ltd. (JP); Nippon Pillar Packing Co., Ltd. (JP)

( * ) Notice: Subject to any disclaimer, the term of this patent is extended or adjusted under 35 U.S.C. 154(b) by 546 days.

(21) Appl. No.: 10/211,381

(22) Filed: Aug. 5, 2002

(65) Prior Publication Data

US 2003/0036597 A1 Feb. 20, 2003

(30) Foreign Application Priority Data

Aug. 8, 2001 (JP) .............................. 2001-240255

(51) Int. Cl.
*B60C 1/00* (2006.01)
*C04B 26/12* (2006.01)
*C08J 3/00* (2006.01)
*C08K 3/04* (2006.01)
*C08L 61/04* (2006.01)

(52) U.S. Cl. ...................... 524/876; 524/495; 524/496; 524/594; 524/700; 524/847

(58) Field of Classification Search ................ 524/495, 524/496, 594, 700, 847, 876
See application file for complete search history.

(56) References Cited

U.S. PATENT DOCUMENTS 5,310,784 A  5/1994  Ide et al.

FOREIGN PATENT DOCUMENTS

| CA | 2022548 | 2/1992 |
| EA | 0 469 166 A1 | 2/1992 |
| JP | H09-087417 | 3/1997 |
| JP | 2001-031880 | 2/2001 |
| JP | 2001-122663 | 5/2001 |

OTHER PUBLICATIONS

European Search Report for Co-pending Foreign Application No. EP 02 01 7531 Dated Nov. 18, 2002.

*Primary Examiner*—Patrick D. Niland
(74) *Attorney, Agent, or Firm*—Rader, Fishman & Grauer PLLC

(57) ABSTRACT

A carbon-phenol resin molding compound is provided, which is preferably used to obtain molded articles having high electrical and thermal conductivities as well as good mechanical strength. The resin molding compound is prepared by reacting a phenol with an aldehyde in the presence of a catalyst, while mixing them with a carbon powder such that a content of the carbon powder in the molding compound is 75 wt % or more. The catalyst is at least one selected from tertiary amines, carbonates, hydroxides and oxides of alkali metals or alkali earth metals.

10 Claims, No Drawings

CARBON-PHENOL RESIN MOLDING COMPOUND

BACKGROUND OF THE INVENTION

1. Field of the Invention

The present invention relates to a molding compound containing a phenol resin and a carbon powder, which is preferably used to mold parts for electric and electronic devices.

2. Disclosure of the Prior Art

In the past, various molding compounds have been used to mold parts for electric and electronic devices. For example, as disclosed in Japanese Patent Early Publication No. 9-87417, a housing or casing for electronic devices needs high electrical conductivity. In addition, Japanese Patent Early Publications No. 2001-31880 and No. 2001-122663 describe that a heat sink for electronic devices needs high thermal conductivity. In these applications, good mechanical strength is also needed.

As the molding compound with the above properties, a molding compound containing a carbon powder and a phenol resin has been known in the past. The phenol resin can be generally obtained by reacting a phenol with a formaldehyde in the presence of a basic catalyst. The phenol resin is mixed and kneaded with the carbon powder, and then a resultant mixture is dried and ground to obtain a powder of the molding compound. By molding the powder of this molding compound in a desired shape at a heating temperature under a pressure, it is possible to obtain molded articles as the parts for electric and electronic devices.

However, this molding compound usually contains a relatively large amount of the phenol resin, i.e., 30 to 40 wt %. As the content of the phenol resin decreases, it becomes difficult to obtain molded articles, in which the carbon powder is uniformly dispersed, because a surface of the carbon powder can not be sufficiently coated with the phenol resin. From this reason, such a large amount of the phenol resin is needed. On the other hands as the content of the phenol resin increases, the bending strength of the molded articles is improved. However, since an amount of the carbon powder in the molding compound relatively decreases, there is a problem of deteriorating the thermal conductivity and the electrical conductivity of the molded articles.

SUMMARY OF THE INVENTION

Therefore, a primary concern of the present invention is to provide a carbon-phenol resin molding compound, which is preferably used to form molded articles having high electrical and thermal conductivities as well as good mechanical strength.

That is, the molding compound of the present invention is obtained by reacting a phenol with an aldehyde in the presence of a catalyst, while mixing them with a carbon powder. The molding compound is characterized in that a content of the carbon powder in the molding compound is 75 wt % or more.

According to the present invention, since a large amount of the carbon powder is uniformly dispersed in the obtained molded articles, the thermal conductivity and the electrical conductivity of the molded articles can be remarkably improved without deterioration in the mechanical properties.

It is preferred that the catalyst is at least one selected from tertiary amines, carbonates, hydroxides and oxides of alkali metals or alkali earth metals. In particular, it is preferred to use the tertiary amine. In this case, it is possible to provide the molded articles containing a reduced amount of nitrogen constituent. From this viewpoint, it is also preferred that a content of nitrogen constituent in the molding compound is 0.3 wt % or less.

Moreover, it is preferred that the carbon powder contains 90 wt % or more of fixed carbon. In this case, it is possible to provide the molded articles with further improved thermal and electric conductivities.

These and still other objects and advantages of the present invention will become more apparent from the detail description of the invention and preferred examples explained below.

The present disclosure relates to subject matter contained in Japanese Patent Application No. 2001-240255, filed on Aug. 8, 2001, the disclosure of which is expressly incorporated herein by reference in its entirety.

DETAIL DESCRIPTION OF THE INVENTION

In the present invention, a carbon-phenol resin molding compound is obtained by reacting a phenol with an aldehyde in the presence of a catalyst, while mixing them with a carbon powder such that a content of the carbon powder in the molding compound is 75 wt % or more.

That is, since carbon particles work as nuclei during the reaction, a wet granular material of the carbon powder and the generated phenol resin is obtained. By filtrating and drying the wet granular material, it is possible to obtain a dry granular powder of the carbon-phenol resin molding compound.

As the carbon powder used in the present invention, for example, it is possible to use natural graphite, artificial graphite, Kish graphite, exfoliated graphite, carbon black, mesophase graphite, coke, charcoal, husk carbon, powder of carbon fiber or the like. In addition, it is preferred to use the carbon powder containing 90 wt % or more of fixed carbon. As the content of fixed carbon increases, the carbon powder contains a higher amount of carbon, and impurities in the carbon powder decrease. Therefore, it is possible to remarkably improve the electric and thermal conductivities of the molded articles. The upper limit of the content of fixed carbon is 100 wt %. A particle size of the carbon powder is not limited. However, it is preferred to use the carbon powder having a particle size of 1 to 200 μm.

In the present invention, as the phenol that is one of the basic ingredients of the phenol resin, it is preferred to use a phenol having hydrophobicity, which is hardly soluble in water. In addition, it is preferred that a solubility in water of the hydrophobic phenol is 5 or less at normal temperature (30° C.). The term of "solubility in water" is defined as the maximum amount (g) of a solute that can be dissolved in 100 g of water. Therefore, 5 or less of the solubility in water of the hydrophobic phenol means that a saturated state is achieved when 5 g of the hydrophobic phenol is dissolved in 100 g of water. When using the hydrophobic phenol, a lower limit of the solubility is zero.

As the hydrophobic phenol, for example, it is possible to use o-cresol, m-cresol, p-cresol, p-t-butyl phenol, 4-t-butyl catechol, m-phenyl phenol, p-phenyl phenol, p-(α-cumyl) phenol, p-nonyl phenol, guaiacol, bisphenol-A, bisphenol-S, bisphenol-F, o-chloro phenol, p-chloro phenol, 2,4-dichloro phenol, o-phenyl phenol, 3,5-xylenol, 2,3-xylenol, 2,5-xylenol, 2,6-xylenol, 3,4-xylenol, p-octylphenol, or the like. One of these compounds or a combination of two or more of these compounds can be used as the hydrophobic phenol.

In addition, a phenol having hydrophilicity that a solubility in water of the phenol is more than 5 at normal temperature (30° C.) may used together with the hydrophobic phenol described above. As such a water-soluble phenol, for example, it is possible to use phenol, catechol, tannin, resorcin, hydroquinone, pyrogallol, or the like. One of these compounds, or a combination of two or more of these compounds can be used as the hydrophilic phenol.

As the amount used of the hydrophobic phenol increases, an effect of preventing aggregation of the wet granular material of the carbon powder and the phenol resin becomes higher. For example, it is preferred that 5 wt % or more of the phenol used in the present invention is the hydrophobic phenol. When the amount used of the hydrophobic phenol is less than 5 wt %, the aggregation of the wet granular material may occurs. An upper limit of the amount used of the hydrophobic phenol is 100 wt %.

As the aldehyde that is the other one of the basic ingredients of the phenol resin, it is particularly preferred to use formalin that is an aqueous solution state of formaldehyde. Alternatively, for example, it is possible to use trioxane, tetraoxane, paraformaldehyde, or the like. In addition, at least a part of formaldehyde may be replaced with furfural or furfuryl alcohol.

In the present invention, as the catalyst used for the additional condensation reaction between the phenol and the aldehyde, it is preferred to use at least one selected from carbonates, hydroxides and oxides of alkali metal such as sodium, potassium, lithium and so on, carbonates, hydroxides and oxides of alkali earth metal such as calcium, magnesium, barium and so on, and tertiary amines. For example, it is possible to use sodium hydroxide, potassium hydroxide, lithium hydroxide, sodium carbonate, calcium hydroxide, magnesium hydroxide, barium hydroxide, calcium carbonate, magnesium oxide, calcium oxide, trimethylamine, triethylamine, triethanolamine, 1,8-diazabicyclo [5,4,0] undecene-7, or the like.

These carbonates, hydroxides and oxides of the alkali metals or the alkali earth metals contain no nitrogen constituent. On the other hand, the tertiary amine contains the nitrogen constituent, but the nitrogen constituent is not incorporated into the phenol resin. In addition to the above-described components, a lubricant, fibers, epoxy resin, and/or a coupling agent may be blended, if necessary.

In the present invention, the phenol, aldehyde, catalyst, carbon powder and the optional components are put in a reaction vessel. In addition, a sufficient amount of water for agitating is added into the reaction vessel. By agitating a resultant mixture in the reaction vessel, the additional condensation reaction between the phenol and the aldehyde proceeds.

At the initial stage of the reaction, the resultant mixture is in a mayonnaise-like state having poor viscosity. However, a flowability of the resultant mixture gradually increases by agitating. As the reaction further proceeds, a condensation product of the phenol and the aldehyde including the carbon powder begins to separate from water. Subsequently, a change of state suddenly happens. That is, a uniformly dispersed state of agglomerated particles of the phenol resin generated by the condensation reaction and the carbon powder is suddenly obtained in the reaction vessel.

After the reaction for generating the phenol resin reaches a desired level, the reaction product is cooled, and then agitating is stopped. Since the agglomerated particles settle down in water, it is possible to readily separate the agglomerated particles from water by filtration to obtain the wet granular material. In addition, water remaining in the wet granular material can be readily removed by drying. As a result, a dry granular powder is obtained, which is a preferable state in handling the molding compound of the present invention.

The obtained granular powder is characterized in that a ratio of the carbon powder and the phenol resin is substantially constant in each particle of the granular powder. Since the phenol resin that works as a binder provides an outermost layer with an extremely thin thickness of the granular powder, the carbon-phenol resin molding compound can be obtained with use of a reduced amount of the phenol resin. As a result, it is possible to relatively increase the content of the carbon powder in the molding compound.

In the present invention, it is essential that a content of the carbon powder in the carbon-phenol resin molding compound is 75 wt % or more. As the content of the carbon powder increases, the thermal and electric conductivities of the molded articles are further improved. On the other hand, to maintain the mechanical strength of the molded articles, it is preferred that the content of the carbon powder in the molding compound is 97 wt % or less.

By the way, when using the hydrophobic phenol, the obtained phenol resin becomes hydrophobicity as the additional condensation reaction proceeds. As a result, the wet granular material that is a mixture of the phenol resin and the carbon powder can be easily removed from water. In addition, since the reaction product has poor hygroscopicity and water absorbing property, it is possible to avoid the occurrence of agglomeration at the time of filtrating the wet granular material from water or drying the wet granular material to obtain the dry granular powder.

In addition, the use of the catalyst listed above is effective to obtain the molded articles not containing nitrogen constituent. As the content of nitrogen constituent in the molded articles increases, the problem of corrosion in the electric and electronic devices using the molded articles as the parts may occur because of an elution of the nitrogen constituent. From this viewpoint, it is preferred that the nitrogen content in the carbon-phenol resin molding compound is 0.3 wt % or less.

Next, a method of molding the carbon-phenol resin molding compound of the present invention to obtain the molded articles is explained. The molding compound is charged into a required die, and then molded at a heating temperature under pressure. For example, it is preferred that the molding step is performed at a heating temperature of 130 to 250° C. under a surface pressure of 10 to 200 MPa.

In particular, it is preferred that a molded article is formed by a two-stage molding method comprising the steps of: preparing a carbon-phenol resin molding compound by reacting a phenol with an aldehyde in the presence of a catalyst, while mixing them with a carbon powder such that a content of the carbon powder in the carbon-phenol resin molding compound is 75 wt % or more; pressing the molding compound in a first die at a pre-molding temperature to obtain a pre-molded article having a shape near the final shape of the molded particle; and pressing the pre-molded article in a second die at a molding temperature higher than the pre-molding temperature to obtain the molded article having the final shape.

Specifically, in the first molding step, it is preferred to set a surface pressure value within a range of 5 to 25 MPa. The first molding step can be performed at room temperature. Even when the first molding step is performed at a heating temperature, it is required that the heating temperature is 100° C. or less. Then, the pre-molded article is set in a heated die, and then pressed to obtain the molded article having the final shape. In the second molding step, it is preferred to set the heating temperature within a range of 130 to 250° C. At this heating temperature, the pre-molded article can be completely cured. In addition, it is preferred that the surface pressure value used in the second molding step is determined within a range of 10 to 200 MPa, and particularly 25 to 200 MPa. Even when using the carbon-phenol resin molding compound having poor flowability, which is composed of a large amount of the carbon powder and a small amount of the phenol resin, it is possible to obtain the molded articles with good quality according to the above two-stage molding method.

EXAMPLES

Example 1

20 parts by weight of bisphenol-A, 365 parts by weight of a phenol, 547 parts by weight of a 37-wt % formalin, 7.7 parts by weight of triethylamine, 1362 parts by weight of a graphite powder, and 1500 parts by weight of water were put in a reaction vessel with an agitator. A solubility in water of the bisphenol A is 0.036 at normal temperature. The graphite powder is of a scale-like powder having an average grain size of about 6 µm and containing 95.3 wt % of fixed carbon. A content of a hydrophobic bisphenol A in the phenol is 5 wt %. The resultant mixture was heated at 90° C., while agitating. It took 60 minutes to heat the mixture to 90° C. The mixture was maintained at 90° C. for 4 hours to finish the reaction. Subsequently, the reaction product in the reaction vessel was cooled at 20° C., and filtration was performed by use of Nutsche filters to obtain a wet granular material having a water content of 22 wt %.

This wet granular material was applied on a polyethylene sheet in a stainless vat to obtain an applied layer having a thickness of about 2 cm. The applied layer was dried in a hot-air circulating type dryer at the temperature of 45° C. for about 48 hours to obtain a dry granular powder having the water content of 0.7 wt % of the carbon-phenol resin molding compound. The graphite content in the molding compound is 79.8 wt %. The content of the phenol resin in the molding compound is 20.2 wt %. The nitrogen content in the molding compound is 0.02 wt %. The nitrogen content was measured by Kjeldahl method, The obtained dry granular powder was charged into a die heated at 160° C., and then molded under a surface pressure of about 25 MPa for 3 min to obtain a molded article.

Example 2

193 parts by weight of o-cresol, 193 parts by weight of a phenol, 529 parts by weight of a 37-wt % formalin, 7.7 parts by weight of potassium hydroxide, 1362 parts by weight of a graphite powder and 1500 parts by weight of water were put in a reaction vessel. A solubility in water of the o-cresol is 2.0 at normal temperature. The graphite powder used is the same one as Example 1. A content of hydrophobic o-cresol in the phenol is 50 wt %. Then, according to a similar procedure to the Example 1, a wet granular material having a water content of 19 wt % was obtained.

Next, as in the case of Example 1, the wet granular material was dried to obtain a dry granular powder having the water content of 0.7 wt % of the carbon-phenol resin molding compound. The graphite content in the molding compound is 79.9 wt %. The content of the phenol resin in the molding compound is 20.1 wt %. The nitrogen content in the molding compound is 0.01 wt %. The obtained dry granular powder was charged into a die heated at 160° C., and then molded under a surface pressure of about 25 MPa for 3 min to obtain a molded article.

Example 3

385 parts by weight of bisphenol-A, 233 parts by weight of a 37-wt % formalin, 3.85 parts by weight of sodium hydroxide, 3.85 parts by weight of triethylamine, 1362 parts by weight of a graphite powder and 1500 parts by weight of water were put in a reaction vessel, The graphite powder used is the same one as Example 1. A content of hydrophobic bispheno-A in the bispheno-A is 100 wt % Then, according to a similar procedure to the Example 1, a wet granular material having a water content of 19.5 wt % was obtained.

In addition, as in the case of Example, 1, the wet granular material was dried at 50° C. to obtain a dry granular powder having the water content of 0.7 wt % of the carbon-phenol resin molding compound. The graphite content in the molding compound is 79.7 wt %. The content of the phenol resin in the molding compound is 20.3 wt %. The nitrogen content in the molding compound is 0.02 wt %. The obtained dry granular powder was charged into a die heated at 160° C., and then molded under a surface pressure of about 25 MPa for 3 min to obtain a molded article.

Example 4

385 parts by weight of bisphenol-A, 233 parts by weight of a 37-wt % formalin, 3.85 parts by weight of sodium hydroxide, 3.85 parts by weight of triethylamine, 5300 parts by weight of a graphite powder and 7500 parts by weight of water were put in a reaction vessel. The graphite powder used is the same one as Example 1. A content of hydrophobic bispheno-A in the bispheno-A is 100 wt %. Then, according to a similar procedure to the Example 1, a wet granular material having a water content of 19.5 wt % was obtained.

In addition, as in the case of Example, 1, the wet granular material was dried at 50° C. to obtain a dry granular powder having the water content of 0.7 wt % of the carbon-phenol resin molding compound. The graphite content in the molding compound is 93.9 wt %. The content of the phenol resin in the molding compound is 6.1 wt %. The nitrogen content in the molding compound is 0.02 wt %. The obtained dry granular powder was charged into a die heated at 160° C., and then molded under a surface pressure of about 25 MPa for 3 min to obtain a molded article.

Example 5

The dry granular powder obtained in Example 4 was molded under a surface pressure of about 10 MPa at room temperature to obtain a pre-molded article having a shape near the final shape. Then, the pre-molded article is charged into a die heated at 160° C., and then molded under a surface pressure of about 50 MPa for 3 min to obtain a molded article.

Example 6

347 parts by weight of a phenol, 448 parts by weight of a 37-wt % formalin, 36 parts by weight of hexamethylene tetramine, 1550 parts by weight of a graphite powder and 1500 parts by weight of water were put in a reaction vessel. The graphite powder used is the same one as Example 1. Then, according to a similar procedure to Example 1, a wet granular material having a water content of 21 wt % was obtained.

In addition, as in the case of Example, 1, the wet granular material was dried to obtain a dry granular powder having the water content of 0.7 wt % of the carbon-phenol resin molding compound. The graphite content in the molding compound is 81.7 wt %. The content of the phenol resin in the molding compound is 18.3 wt %. The nitrogen content in the molding compound is 0.9 wt %. The obtained dry granular powder was charged into a die heated at 160° C., and then molded under a surface pressure of about 25 MPa for 3 min to obtain a molded article.

Comparative Example 1

244 parts by weight of a powder-like alkali-resol type phenol resin were ball-milled, and then a required amount of methanol was added to the ball-milled phenol resin to obtain a slurry. Next, 760 parts by weight of a graphite powder was added to the slurry and then a resultant mixture was agitated by use of a kneader. The graphite powder is of a scale-like powder having an average grain size of 100 μm and containing 95.3 wt % of fixed carbon. After the resultant mixture was dried at 60° C., a small amount of magnesium stearate was added and mixed by use of a mixer to obtain a carbon-phenol resin molding compound. The graphite content in the molding compound is 76 wt %. The content of the phenol resin in the molding compound is 24 wt %. The nitrogen content in the molding compound is 0.02 wt %.

The molding compound was charged into a die heated at 160° C., and then molded under a surface pressure of about 25 MPa for 3 min to obtain a molded article.

Comparative Example 2

A carbon-phenol resin molding compound was prepared according to the substantially same method as Example 1 other than that 800 parts by weight of the graphite powder was used. The graphite content in the molding compound is 70 wt %. The content of the phenol resin in the molding compound is 30 wt %. The nitrogen content in the phenol resin is 0.02 wt %. The molding compound was charged into a die heated at 160° C., and then molded under a surface pressure of about 25 MPa for 3 min to obtain a molded article.

(Evaluation)

Compositions of the molding compounds of Examples 1 to 6 and Comparative Examples 1 and 2 are shown in Table 1. With respect to the molding compound of each of Examples 1 to 6 and Comparative Examples 1 and 2, specific gravity, bending strength, bending elastic modulus, Rockwell hardness, surface resistivity, volume resistivity and thermal conductivity were measured. That is, the specific gravity, bending strength, and the bending elastic modulus were measured according to the methods defined in JIS (Japanese Industrial Standards) K 6911. The hardness was measured according to the method defined in JIS K 7202. In addition, the surface resistivity and the volume resistivity were measured according to the methods defined in JIS K 7194. The thermal conductivity in the diameter direction of the molded article was measured by a laser flash method. Results are shown in Table 2.

As shown in Table 2, the molded article of each of Examples 1 to 6 has small surface resistivity and volume resistivity, and high electrical and thermal conductivities in comparison with the molded article of Comparative Example 1. Moreover, the molded articles of those Examples maintain improved mechanical strength. The molded article of Comparative Example 2 exhibits good mechanical strength, but is poor in the electrical and thermal conductivities because the content of the graphite powder in the molding compound is too small.

TABLE 1

| | Phenol | Hydrophobic Phenol | Phenol (%) | Catalyst | Resin Content (wt %) | Carbon Content (wt %) | Nitrogen Content (wt %) |
|---|---|---|---|---|---|---|---|
| Example 1 | Phenol | Bisphenol-A | 5 | Triethylamine | 20.2 | 79.8 | 0.02 |
| Example 2 | Phenol | o-cresol | 50 | KOH | 20.1 | 79.9 | 0.01 |
| Example 3 | — | Bisphenol-A | 100 | NaOH Triethylamine | 20.3 | 79.7 | 0.02 |
| Example 4 | — | Bisphenol-A | 100 | NaOH Triethylamine | 6.1 | 93.9 | 0.02 |
| Example 5 | — | Bisphenol-A | 100 | NaOH Triethylamine | 6.1 | 93.9 | 0.02 |
| Example 6 | Phenol | — | 0 | Hexamethylene-Tetramine | 18.3 | 81.7 | 0.9 |
| Comparative Example 1 | Phenol | — | 0 | KOH | 24 | 76 | 0.02 |
| Comparative Example 2 | Phenol | Bisphenol-A | 5 | Triethylamine | 30 | 70 | 0.02 |

TABLE 2

| | Specific Gravity | Bending Strength (MPa) | Bending Elastic Modulus ($10^4$ MPa) | Rockwell Hardness ($H_RR$) | Surface Resistivity ($\Omega/\square$) | Volume Resistivity ($\Omega \cdot cm$) | Thermal Conductivity (cal/cm · s · °C.) |
|---|---|---|---|---|---|---|---|
| Example 1 | 1.90 | 39 | 1.4 | 92 | $3.6 \times 10^{-2}$ | $2.8 \times 10^{-2}$ | 0.043 |
| Example 2 | 1.91 | 48 | 1.7 | 95 | $3.3 \times 10^{-2}$ | $2.9 \times 10^{-2}$ | 0.047 |
| Example 3 | 1.90 | 37 | 1.3 | 78 | $4.0 \times 10^{-2}$ | $3.1 \times 10^{-2}$ | 0.047 |
| Example 4 | 2.10 | 47 | 1.6 | 94 | $2.7 \times 10^{-3}$ | $2.4 \times 10^{-3}$ | 0.054 |
| Example 5 | 2.00 | 46 | 1.5 | 93 | $2.8 \times 10^{-3}$ | $2.6 \times 10^{-3}$ | 0.052 |

TABLE 2-continued

|  | Specific Gravity | Bending Strength (MPa) | Bending Elastic Modulus ($10^4$MPa) | Rockwell Hardness ($H_RR$) | Surface Resistivity ($\Omega/\square$) | Volume Resistivity ($\Omega \cdot$ cm) | Thermal Conductivity (cal/cm $\cdot$ s $\cdot$ °C.) |
|---|---|---|---|---|---|---|---|
| Example 6 | 1.92 | 38 | 1.4 | 90 | $3.4 \times 10^{-2}$ | $2.9 \times 10^{-2}$ | 0.048 |
| Comparative Example 1 | 1.88 | 35 | 1.0 | 73 | $2.1 \times 10^{-1}$ | $4.6 \times 10^{-1}$ | 0.012 |
| Comparative Example 2 | 1.80 | 50 | 1.8 | 96 | $8.5 \times 10^{-1}$ | $7.8 \times 10^{-1}$ | 0.011 |

What is claimed is:

1. A carbon-phenol resin molding compound obtained by reacting a phenol with an aldehyde in the presence of a catalyst, while mixing with a carbon powder, wherein (a) a content of said carbon powder in the molding compound is 75 wt % or more, (b) a content of nitrogen constituent in the molding compound is 0.3 wt % or less, and (c) said catalyst is at least one selected from the group consisting of tertiary amines, carbonates, hydroxides and oxides of alkali metals or alkali earth metals.

2. The molding compound as set forth in claim 1, wherein said catalyst is a tertiary amine.

3. The resin molding compound as set forth in claim 1, wherein said carbon powder contains 90 wt % or more of fixed carbon.

4. The molding compound as set forth in claim 1, wherein said catalyst is selected from the group consisting of tertiary amines and hydroxides of alkali metals.

5. The molding compound as set forth in claim 1, wherein said catalyst is triethylamine.

6. The molding compound as set forth in claim 1, wherein said catalyst is KOH.

7. The molding compound as set forth in claim 1, wherein said catalyst is NaOH and triethylamine.

8. The molding compound as set forth in claim 1, wherein said phenol includes 5 wt % or more of a hydrophobic phenol, and a solubility in water of said hydrophobic phenol is 5 or less at normal temperature.

9. A carbon-phenol resin molding compound obtained by reacting a phenol with an aldehyde in the presence of a catalyst, while mixing with a carbon powder, wherein (a) a content of said carbon powder in the molding compound is 75 wt % or more, (b) a content of nitrogen constituent in the molding compound is 0.3 wt % or less, (c) said phenol includes 5 wt % or more of a hydrophobic phenol, (d) the solubility in water of said hydrophobic phenol is 5 or less at normal temperature, and (e) said catalyst is at least one selected from the group consisting of tertiary amines, carbonates, hydroxides, and oxides of alkali metals or alkali earth metals.

10. The molding compound as set forth in claim 9, which is in a manufacturing molded article for electric and electronic device.

* * * * *